United States Patent
Koepke et al.

(10) Patent No.: US 6,434,505 B1
(45) Date of Patent: Aug. 13, 2002

(54) METHOD FOR DETERMINING THE INSTANTANEOUS WINDING TEMPERATURE OF THE STATOR WINDING OF A THREE-PHASE AC MOTOR, IN PARTICULAR A POLE-CHANGEABLE ASYNCHRONOUS MOTOR

(75) Inventors: Michael Koepke, Wetter; Eberhard Schröder, Halver; Uwe Varchmin, Wolfenbüttel, all of (DE)

(73) Assignee: Atecs Mannesmann AG, Düsseldorf (DE)

( * ) Notice: Subject to any disclaimer, the term of this patent is extended or adjusted under 35 U.S.C. 154(b) by 82 days.

(21) Appl. No.: 09/688,468

(22) Filed: Oct. 16, 2000

(51) Int. Cl.$^7$ .............................. G01K 5/72; H02H 5/04
(52) U.S. Cl. ........................ 702/130; 702/132; 318/806; 374/40
(58) Field of Search .................. 702/130, 131, 702/132, 186, 29; 374/40, 135; 318/806; 330/146; 73/204.23; 600/549

(56) References Cited

U.S. PATENT DOCUMENTS 6,199,018 B1 * 3/2001 Quist et al. .................. 318/806

FOREIGN PATENT DOCUMENTS

| DE | 31 11 818 A1 | 4/1982 | | |
|---|---|---|---|---|
| DE | 43 26 680 C1 | 2/1995 | | |
| DE | 196 14 900 A1 | 10/1997 | | |
| DE | 197 56 955 A1 | 7/1999 | | |
| DE | 201 14 910 | * 11/2001 | ............ | G01K/5/72 |
| EP | 0 803 465 A2 | 10/1997 | | |
| GB | 2333189 | * 7/2001 | ............. | H02P/8/36 |

* cited by examiner

*Primary Examiner*—Kamini Shah
(74) *Attorney, Agent, or Firm*—Henry M. Feiereisen

(57) ABSTRACT

The invention relates to a method for determining the winding temperature (TW) of the stator winding of a three-phase AC motor, in particular a pole-changeable asynchronous motor. For determining the winding temperature (TW) of the stator winding of three-phase AC motors that have an unfavorable ratio of the active power to the dissipation power and react sensitively to temperature changes and changes in a main voltage, and for readily determining the heat dissipation power (PV) from the winding temperature (TW) of the stator winding, it is proposed to determine the reference temperature (TG) and the motor current (IM) simultaneously at consecutive points in time, and to determine the winding temperature (TW) by calculating step-by-step sequentially the change in the winding temperature (TW) at a point in time (tn) and adding this change to the winding temperature (TW) of the immediately preceding point in time (tn−1). The change of the winding temperature (TW) associated with a point in time (tn) is proportional to the electrical heat dissipation power (PV) that is converted into heat in the stator winding at the point in time (tn) and to the temperature difference between the reference temperature (TG) of the housing at that point in time (tn) and the winding temperature (TW) at the immediately preceding point in time (tn−1). The winding temperature (TW) of the immediately preceding point in time (tn−1) is also used for calculating the heat dissipation power (PV).

20 Claims, 1 Drawing Sheet

METHOD FOR DETERMINING THE INSTANTANEOUS WINDING TEMPERATURE OF THE STATOR WINDING OF A THREE-PHASE AC MOTOR, IN PARTICULAR A POLE-CHANGEABLE ASYNCHRONOUS MOTOR

BACKGROUND OF THE INVENTION

The invention relates to a method for determining the instantaneous winding temperature of the stator winding of a three-phase AC motor, in particular a pole-changeable asynchronous motor.

DE 196 14 900 A1 discloses a method for determining the winding temperature of electrical machines, in particular asynchronous motors. In this reference, the winding temperature is calculated from the motor current and the housing temperature which is measured by a temperature sensor and evaluated by using a neural network. Disadvantageously, this method is relatively complex, in particular the aspect of training the neural network.

The method disclosed in DE 196 14 900 A1 also suggests to calculate the winding temperature from the electrical dissipated energy, with the asynchronous motor being viewed as a system of thermally coupled bodies. The parameters describing the temperature characteristic of the bodies are the thermal resistances between the bodies and the respective heat capacity of the individual bodies. The single input parameter for the calculation is the motor current, which is used to calculate the electrical heat losses which cause heating of the motor. These calculations using this method do not include measuring the housing temperature and are disadvantageously very complex.

SUMMARY OF THE INVENTION

It is a therefore an object of the invention to provide a method for determining the winding temperature of the stator winding of three-phase AC motors that have an unfavorable ratio of the active power to the dissipation power and react sensitively to temperature changes and changes in the supply voltage. The heat dissipation power can then be easily determined from the winding temperature of the stator winding.

According to an aspect of the invention, the motor current and a reference temperature are measured continuously at successive times and at a location on the three-phase motor that is thermally connected with the stator, the motor housing or at least a portion of the motor housing, by taking into account the heat capacity of the stator winding and the thermal resistance between the stator winding and the measurement location. The winding temperature is then calculated from values of reference temperature and the motor current. The winding temperature is calculated by calculating sequentially step-by-step the change in the winding temperature for a certain point in time and adding this change to the winding temperature of the immediately preceding point in time. The increase of the winding temperature associated with a certain point in time is set to be proportional to the electrical heat dissipation power that is converted at this point in time into heat in the stator winding, and the decrease of the winding temperature is set to be proportional to the temperature difference between the reference temperature at this point in time and the winding temperature at the immediately preceding point in time. The proportionality factor is defined for the heat dissipation power as the reciprocal value of the heat capacity, whereas the proportionality factor for the temperature difference is the reciprocal value of the thermal resistance multiplied by the heat capacity. The heat dissipation power is calculated from the square of the effective value of the motor current at this point in time multiplied with the temperature-dependent electrical winding resistance of the stator winding. However, the winding resistance for the winding temperature at the immediately preceding point in time in used for this calculation. This produces an iterative calculation method, wherein the change of the winding temperature from one point in time to the next can be calculated mathematically in a very simple manner. Here, the previously calculated winding temperature i.e., the winding temperature at the immediately preceding point in time, is inserted as the instantaneous winding temperature. In other words, the winding temperature is "fed back" in the calculation as the instantaneous winding temperature. If the time interval between the consecutive points in time where the motor current and the reference temperature are measured, are selected to be sufficiently small, then the winding temperature can be easily calculated and will agree quite accurately with the instantaneous winding temperature.

Even if an almost arbitrary start value is selected for the winding temperature, the instantaneous winding temperature is derived after only a few seconds, if a period length of the motor current includes a plurality of equidistant points in time.

20 equidistant points are already sufficient for the method to operate accurately within the period length of the motor current.

A change in the number of poles of the three-phase AC motor can be taken into consideration simply by changing the thermal resistance at the same point in time when the number of poles is changed.

Advantageously, the start value for the winding temperature is taken as the reference temperature which is not substantially different from the winding temperature due to the thermal coupling between the stator winding and the housing.

In the simplest case, the change in the winding temperature can be calculated by using the following difference equation:

$$TW_{(m)} - TW_{(m-1)} =$$
$$(t_n - t_{n-1}) * \left( \frac{1}{CW} * IMeff_{(m)}^2 * R_{(TW_{(m-1)})} - \frac{1}{CW*WD} * (TW_{(m-1)} - TG_{(m)}) \right)$$

The accuracy of the method can be improved further by using different values for the thermal resistance when the motor is switched off, since in this case the cooling effect from the motor fan is absent.

BRIEF DESCRIPTION OF THE DRAWINGS

An exemplary embodiment of the invention is illustrated in FIG. 1 which shows in form of a schematic diagram the cyclical calculation of the winding temperature.

DETAILED DESCRIPTION OF PREFERRED EMBODIMENTS

Figure 1:
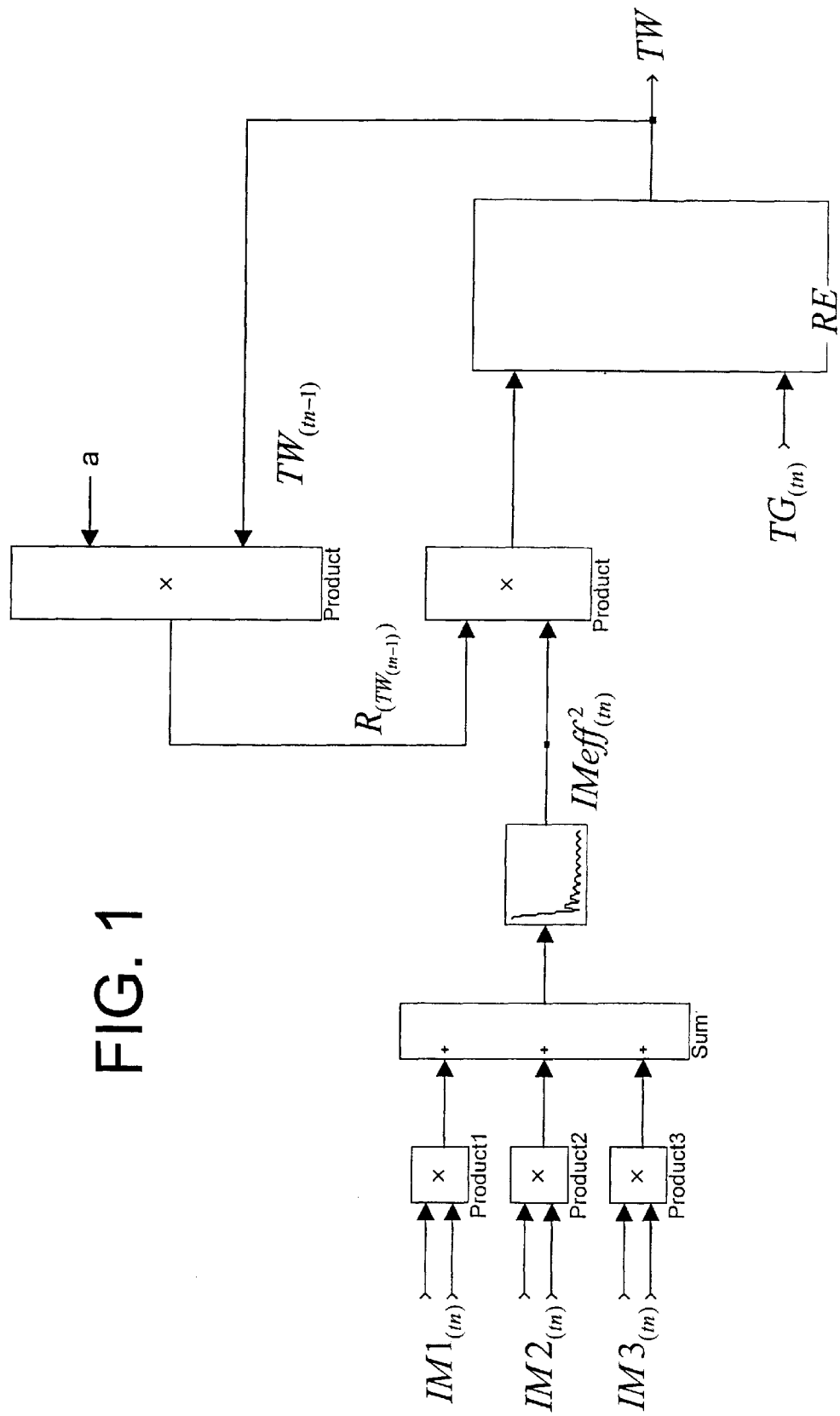

The method depicted schematically in FIG. 1 will now be described. The method can be used to determine the winding temperature of a pole-changeable asynchronous motor with, for example, 2 and 8 poles, respectively. The motor includes a housing and a stator with a stator winding disposed in the housing. The housing is connected with the stator through two-dimensional metal contacts, i.e., the stator and the housing are in good thermal contact with one another, so that heat can flow from the stator winding to the stator and further to the housing that can be equipped with cooling fins. A temperature sensor is attached at a measurement location on the housing or on at least on a portion of the housing, which can be easily accessible, for measuring a reference temperature TG at the measurement location. The three-phase AC motor is energized by three-phase alternating current forming the motor current IM which is composed of the three motor currents IM1, IM2, IM3 corresponding to the three phases.

A constant time-independent heat capacity CW and a thermal resistance WD that is also constant over time and extends from the stator winding via the stator to the measurement location on the housing, represent parameters of the asynchronous motor that determine its thermal characteristic. These two parameters can be determined for each motor type by known measurement methods. The respective thermal resistance WD2 and WD8 of the asynchronous motor is different for the two pole numbers 2 and 8.

A sensor electronics determines continuously and essentially simultaneously at predetermined equidistant points in time tn the reference temperature TG(tn) and the motor current IM(tn) and/or IM1(tn), IM2(tn), IM3(tn), respectively. It will be understood however, that the points in time tn need not be equidistant.

For each point in time tn, an effective value IMeff(tn) is formed from the continuous values of the motor current IM(tn) (and/or IM1(tn), IM2(tn), IM3(tn), respectively). As illustrated in FIG. 1, this is accomplished by forming for each point in time tn the square of the three motor currents IM1(tn)*IM1(tn), IM2(tn)*IM2(tn), IM3(tn)*IM3(tn) and summing the squares. Thereafter, the linear average is calculated from the last 20 summed values, with the linear average being equal to IMeff(tn)*IMeff(tn), which is also the square of the effective value of the motor current IMeff(tn).

The successive values of the reference temperature TG(tn) and the effective value of the motor current IMeff(tn) are used as input values and/or independent variables for calculating the change in the winding temperature $(TW_{(tn)} - TW_{(tn-1)})$ by using the following difference equation:

$$TW_{(tn)} - TW_{(tn-1)} =$$
$$(t_n - t_{n-1}) * \left( \frac{1}{CW} * IMeff_{(tn)}^2 * R_{(TW_{(tn-1)})} - \frac{1}{CW * WD} * (TW_{(tn-1)} - TG_{(tn)}) \right)$$

As seen from the equation, the heat dissipation power PV is calculated by multiplying the square of the effective value of the motor current IMeff(tn) with the temperature-dependent electrical winding resistance R which is proportional to the winding temperature TW expressed in degrees Kelvin, i.e., it holds R=a*TW and therefore R=R(tn)=R(TW(tn))=a*TW(tn). The constant a can be determined in a known manner.

The quantity R(TW(tn−1)) enters the difference equation, i.e., the winding resistance R is a function of the winding temperature TW at the point in time tn−1 immediately preceding the point in time tn.

The difference equation is used to calculate the change in the winding temperature for a point in time tn by using the calculated winding temperature TW(tn−1) of the immediately preceding point in time tn−1 and adding the calculated change to the winding temperature TW(tn−1). Depending if the change as positive or negative, the winding temperature TW(tn−1) either increases or decreases. The calculations are performed sequentially step-by-step, so that the calculation always makes reference to the preceding winding temperature TW(tn−1). This feature is illustrated in FIG. 1 as a "feedback" of the calculated winding temperature TW.

In the calculation according to the difference equation, the change of the winding temperature TW is set to be proportional to the heat dissipation power PV which corresponds to the heat produced in the stator winding per unit time at the point in time tn. The associated temperature increase of the stator winding, on the other hand, is reduced by the heat that is transferred to the housing which is proportional to the temperature difference between the reference temperature TG(tn) and the winding temperature TW(tn).

However, the temperature that is inserted into difference equation is the winding temperature TW(tn−1) at the immediately preceding point in time tn−1. As mentioned above, this approach nevertheless yields the instantaneous winding temperature TW(tn) with a relatively high accuracy.

Although an almost arbitrary start value can be assumed for the winding temperature TW(tn−1) at the beginning of the iteration, the method produces the instantaneous winding temperature TW after only a few seconds. However, the start value is preferably the reference temperature TG(tn), since TG(tn) is not significantly different from the winding temperature TW. The method operates very accurately with only 20 equidistant points per period length of the motor current. During a period length of the motor current IM, which is equal to 20 milliseconds, the winding temperature TW is calculated repeatedly by cycling through equidistant time intervals of one millisecond, with the calculation always being completed within the one millisecond. In other words, the calculation is performed in real time.

When the number of poles is switched from 2 to 8, the thermal resistance WD2 in the difference equation is replaced by WD8, and vice versa. Likewise, the heat capacities CW2 and CW8 which depend only slightly on the number of poles, can also be interchanged.

Different values can be used for the thermal resistance when the three-phase motor is switched off, since the motor-operated fan does not provide a cooling effect when the motor is at rest.

All calculations can be performed in a computation unit (RE), such as a microprocessor.

LIST OF REFERENCE SYMBOLS

| | |
|---|---|
| CW | heat capacity |
| IM (IM1, IM2, IM3) | instantaneous value motor current (3 phases) |
| IMeff | effective value of the motor current |
| PV | heat dissipation power |
| R | winding resistance |
| RE | computing unit |
| TG | reference temperature |
| tn | point in time for sensing |
| tn-1 | preceding point in time |
| TW | winding temperature |
| WD | thermal resistance |

What is claimed is:
1. A method for determining an instantaneous winding temperature of a stator winding of a three-phase AC motor, comprising the steps of:
   (a) determining simultaneously at a point in time a motor current and a reference temperature at a measurement location of the three-phase AC motor, with the mea- surement location located on one of the stator, housing, and a portion of a housing of the three-phase AC motor;

(b) determining a winding temperature at the point in time by calculating a change in the winding temperature with respect to an immediately preceding point in time and adding the change to the winding temperature, wherein the change in the winding temperature is proportional to an electrical heat dissipation power that is converted into heat in the stator winding at the point in time, with the heat dissipation power being calculated from the square of an effective value of the motor current at the point in time multiplied by a temperature-dependent electrical winding resistance of the stator winding, with the winding resistance taken for the winding temperature of the immediately preceding point in time, and wherein the change is also proportional to a temperature difference between the reference temperature at the point in time and the winding temperature at the immediately preceding point in time, wherein a proportionality factor of the change with the heat dissipation power is an inverse value of the heat capacity of the stator winding and the proportionality factor of the change with the temperature difference is an inverse value of the thermal resistance between the stator winding and the measurement location multiplied with the heat capacity; and (c) repeating steps (a) and (b) for the immediately following point in time.

2. The method according to claim 1, wherein a duration of a period length of the motor current includes a plurality of the points in time having an equal spacing.

3. The method according to claim 2, wherein the duration of a period length includes at least 20 points of the plurality of points in time.

4. The method according to claim 1, wherein the thermal resistance is changed when a number of poles of the three-phase motor is changed.

5. The method of claim 1, wherein the winding temperature at the immediately preceding point in time is a motor housing temperature when step (b) is performed for the first time.

6. The method according to claim 1, wherein the change in the winding temperature is calculated by solving the difference equation $$TW_{(tn)} - TW_{(tn-1)} = (t_n - t_{n-1}) * \left( \frac{1}{CW} * IMeff_{(tn)}^2 * R_{(TW_{(tn-1)})} - \frac{1}{CW * WD} * (TW_{(tn-1)} - TG_{(tn)}) \right)$$

wherein the winding temperature $TW_{(tn-1)}$ is the winding temperature at a point in time that immediately precedes the point in time where $TW_{(tn)}$ is calculated.

7. The method according to claim 1, wherein a different value is used for the thermal resistance when the three-phase AC motor is switched off.

8. A method for determining an instantaneous winding temperature of a stator winding of a three-phase AC motor, comprising the steps of:

(a) determining simultaneously at a point in time a motor current and a reference temperature at a measurement location of the three-phase AC motor, with the measurement location located on one of the stator, housing, and a portion of a housing of the three-phase AC motor;

(b) determining a winding temperature at the point in time by calculating a change in the winding temperature with respect to an immediately preceding point in time and adding the change to the winding temperature, wherein the change in the winding temperature is proportional to an electrical heat dissipation power that is converted into heat in the stator winding at the point in time, with the heat dissipation power being calculated from the square of an effective value of the motor current at the point in time multiplied by a temperature-dependent electrical winding resistance of the stator winding, with the winding resistance taken for the winding temperature of the immediately preceding point in time, and wherein the change is also proportional to a temperature difference between the reference temperature at the point in time and the winding temperature at the immediately preceding point in time, wherein a proportionality factor of the change with the heat dissipation power is an inverse value of the heat capacity of the stator winding and the proportionality factor of the change with the temperature difference is an inverse value of the thermal resistance between the stator winding and the measurement location multiplied with the heat capacity; and (c) repeating steps (a) and (b) for the immediately following point in time, (d) wherein the winding temperature at the immediately preceding point in time is a starting value for the winding temperature when step (b) is performed for the first time.

9. The method according to claim 8, wherein a duration of a period length of the motor current includes a plurality of the points in time having an equal spacing.

10. The method according to claim 9, wherein the duration of a period length includes at least 20 points of the plurality of points in time.

11. The method according to claim 8, wherein the thermal resistance is changed when a number of poles of the three-phase motor is changed.

12. The method of claim 8, wherein the starting value for the winding temperature at the immediately preceding point in time is a motor housing temperature.

13. The method according to claim 8, wherein the change in the winding temperature is calculated by solving the difference equation $$TW_{(tn)} - TW_{(tn-1)} = (t_n - t_{n-1}) * \left( \frac{1}{CW} * IMeff_{(tn)}^2 * R_{(TW_{(tn-1)})} - \frac{1}{CW * WD} * (TW_{(tn-1)} - TG_{(tn)}) \right)$$

wherein the winding temperature $TW_{(tn-1)}$ is the winding temperature at a point in time that immediately precedes the point in time where $TW_{(tn)}$ is calculated.

14. The method according to claim 8, wherein a different value is used for the thermal resistance when the three-phase AC motor is switched off.

15. A method for determining the instantaneous winding temperature of a stator winding of a three-phase AC motor, comprising the steps of:

(a) measuring at a point in time a motor current and a reference temperature at a measurement location of the three-phase AC motor, with the measurement location located on one of the stator, housing, and a portion of a housing of the three-phase AC motor;

(b) calculating a winding temperature at the point in time as a function of the measuring step (a);

(c) repeating steps (a) and (b) for an immediately following point in time;

(d) calculating a change in the winding temperature with respect to the immediately preceding point in time and adding the change to the winding temperature, wherein the change in the winding temperature is proportional to an electrical heat dissipation power that is converted into heat in the stator winding at the point in time, with the heat dissipation power being calculated from the square of an effective value of the motor current at the point in time multiplied by a temperature-dependent electrical winding resistance of the stator winding, with the winding resistance taken for the winding temperature of the immediately preceding point in time, and wherein the change is also proportional to a temperature difference between the reference temperature at the point in time and the winding temperature at the immediately preceding point in time, wherein a proportionality factor of the change with the heat dissipation power is an inverse value of the heat capacity of the stator winding and the proportionality factor of the change with the temperature difference is an inverse value of the thermal resistance between the stator winding and the measurement location multiplied with the heat capacity; and (e) repeating steps (c) and (d) for immediately following points in time.

16. The method according to claim 15, wherein a duration of a period length of the motor current includes a plurality of the points in time having an equal spacing.

17. The method according to claim 16, wherein the duration of a period length includes at least 20 points of the plurality of points in time.

18. The method according to claim 15, wherein the thermal resistance is changed when a number of poles of the three-phase motor is changed.

19. The method according to claim 15, wherein the change in the winding temperature is calculated by solving the difference equation $$TW_{(tn)} - TW_{(tn-1)} = (t_n - t_{n-1}) * \left( \frac{1}{CW} * IMeff_{(tn)}^2 * R_{(TW_{(tn-1)})} - \frac{1}{CW*WD} * (TW_{(tn-1)} - TG_{(tn)}) \right)$$

wherein the winding temperature $TW_{(tn-1)}$ is the winding temperature at a point in time that immediately precedes the point in time where $TW_{(tn)}$ is calculated.

20. The method according to claim 15, wherein a different value is used for the thermal resistance when the three-phase AC motor is switched off.

* * * * *

UNITED STATES PATENT AND TRADEMARK OFFICE
CERTIFICATE OF CORRECTION

PATENT NO.      : 6,434,505 B1                               Page 1 of 1
DATED           : August 13, 2002
INVENTOR(S)     : Michael Koepke et al.

It is certified that error appears in the above-identified patent and that said Letters Patent is hereby corrected as shown below:

<u>Title page,</u>
Please insert:
--      Foreign Application Priority Data
[30]    199 51 208    10-15-1999    Germany --

Signed and Sealed this

Twenty-first Day of January, 2003

JAMES E. ROGAN
*Director of the United States Patent and Trademark Office*